United States Patent
Perry et al.

(10) Patent No.: US 10,365,960 B2
(45) Date of Patent: Jul. 30, 2019

(54) PROVIDING A WATCHDOG TIMER TO ENABLE COLLECTION OF CRASH DATA

(71) Applicant: Google LLC, Mountain View, CA (US)

(72) Inventors: Ryan Perry, San Francisco, CA (US); Jeffrey Hall Seibert, Jr., Cambridge, MA (US); Zhen Ma, San Francisco, CA (US); Matt Massicotte, Quincy, MA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 15/617,169

(22) Filed: Jun. 8, 2017

(65) Prior Publication Data
US 2017/0269987 A1 Sep. 21, 2017

Related U.S. Application Data

(63) Continuation of application No. 15/056,222, filed on Feb. 29, 2016, now Pat. No. 9,921,902, which is a continuation of application No. 14/100,579, filed on Dec. 9, 2013, now Pat. No. 9,274,894.

(51) Int. Cl.
*G06F 11/00* (2006.01)
*G06F 11/07* (2006.01)
*G06F 11/14* (2006.01)

(52) U.S. Cl.
CPC ...... *G06F 11/0778* (2013.01); *G06F 11/0706* (2013.01); *G06F 11/0715* (2013.01); *G06F 11/0757* (2013.01); *G06F 11/0787* (2013.01); *G06F 11/1402* (2013.01); *G06F 11/1415* (2013.01); *G06F 11/1441* (2013.01)

(58) Field of Classification Search
CPC .................................................. G06F 11/0778
See application file for complete search history.

(56) References Cited

U.S. PATENT DOCUMENTS

| | | | |
|---|---|---|---|
| 8,750,123 | B1 | 6/2014 | Alisawi |
| 8,909,202 | B2 | 12/2014 | Luna et al. |
| 2003/0167421 | A1 | 9/2003 | Klemm |
| 2006/0253163 | A1 | 11/2006 | Stubbs et al. |
| 2011/0075054 | A1 | 3/2011 | Chuang et al. |
| 2013/0152050 | A1 | 6/2013 | Chang et al. |
| 2014/0201578 | A1 | 7/2014 | Kosut et al. |
| 2014/0321448 | A1 | 10/2014 | Backholm et al. |

*Primary Examiner* — Christopher S Mccarthy
(74) *Attorney, Agent, or Firm* — Fish & Richardson P.C.

(57) ABSTRACT

A system and method for providing a watchdog timer to enable collection of crash data is provided. Upon execution of certain operations, a source thread of an application initiates a watchdog thread that periodically sample state of data relating to the application. Should the operation not complete within a watchdog timeout period, the watchdog thread invokes a crash function to collect additional state data. At least a portion of the state data is stored for later analysis and debugging.

17 Claims, 4 Drawing Sheets

PROVIDING A WATCHDOG TIMER TO ENABLE COLLECTION OF CRASH DATA

CROSS-REFERENCE TO RELATED APPLICATIONS

The present application is a continuation of U.S. patent application Ser. No. 15/056,222, filed Feb. 29, 2016, which is a continuation of U.S. patent application Ser. No. 14/100,579, filed Dec. 9, 2013. The contents of the prior applications are incorporated herein by reference in their entirety.

BACKGROUND INFORMATION

Certain mobile operating systems, such as iOS available from Apple, Inc. include operating system imposed timeout periods for applications executing on the mobile device. Typically, these operating system timeout periods are designed to ensure that if an application encounters an error condition that does not cause a crash, but instead results in the application entering a hung state for a predefined period of time, the mobile operating system terminates the application. Typically, these timeout periods are associated with certain predefined operations of an application, e.g., the initial launching of an application, the act of moving the application to the background and/or returning the application to the foreground. For example, it has been noted that iOS will typically terminate an application if the application has not completed its initial launching procedure within approximately 20 seconds.

While the termination of applications that have exceeded the mobile operating system's timeout period may work to ensure stability of the mobile device by preventing applications from hanging, the abrupt termination of the application by the mobile operating system provides a challenge for application developers to obtain debugging information that may be utilized to determine the cause of the application hanging. For example, application developers may include debugging software that detects when a conventional error condition (i.e., crash) occurs and records certain state information that may be used later for debugging purposes. However, the mobile operating system's abrupt termination of an application that exceeds the timeout period does not enable the debugging software to collect state information associated with the application. In these cases, the application developer receives no information relating to the crash.

SUMMARY OF THE INVENTION

The present invention relates generally to application debugging and more particularly to collecting state and crash data that may be later provided to a developer of an application The present invention overcomes the disadvantages of the prior art by providing a system and method for providing a watchdog timer to enable collection of crash data in applications that reach a mobile operating system's timeout period. In one aspect, the invention relates to a watchdog thread that is associated with a source thread of an application. Upon initiating an operation with which a timeout period is associated, the source thread initiates the watchdog thread. The watchdog thread constructs an asynchronous semaphore that is then passed to the source thread with a request to be responded to upon completion of the operation.

In one embodiment, if the source thread has not completed the operation within a watchdog timeout period that is slightly shorter in duration than the mobile operating system's timeout period, the watchdog thread invokes a crash function that causes crash data relating to the state of the device and application to be collected. In a second embodiment, the watchdog thread collects state data associated with the application at regular intervals so that in the event of the mobile operating system terminating the application, state data has been collected relating to the operation of the application. In a third embodiment, the watchdog thread collects state data associated with the application at regular intervals; however, the watchdog thread is also configured to not invoke a crash function and permit the mobile operating system to terminate the application upon the expiration of the operating system timeout period.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A computer network is a geographically distributed collection of entities interconnected by communication links and segments for transporting data between end nodes, such as personal computers, workstations, mobile devices etc. Many types of networks are available, ranging from Wi-Fi networks, cellular telephone networks, local area networks (LANs) to wide area networks (WANs). Wi-Fi is a mechanism for wirelessly connecting a plurality of electronic devices (e.g. computers, cell phones, etc.) A device enabled with Wi-Fi capabilities may connect to the Internet via a wireless network access point, as known to those skilled in the art. Cellular networks are radio networks distributed over large areas called "cells", wherein each cell may be served at least one fixed-location transceiver known as a cell site or base station. When joined together, these cells may provide radio coverage over a wide geographic area. As known by those skilled in the art, this may enable a large number of portable transceivers (e.g., mobile phones), to communicate with each other. LANs typically connect the entities over dedicated communication links located in the same general physical location, such as a building or a campus. WANs, on the other hand, typically connect geographically dispersed entities for long-distance communication links, such as common carrier telephone lines, optical light paths, synchronous optical network (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as Transmission Control Protocol/Internet Protocol TCP/IP, Hypertext Transfer Protocol (HTTP), etc. In this context, a protocol consists of a set of rules defining how the entities interact with each other and how packets and messages are exchanged.

Figure 1:
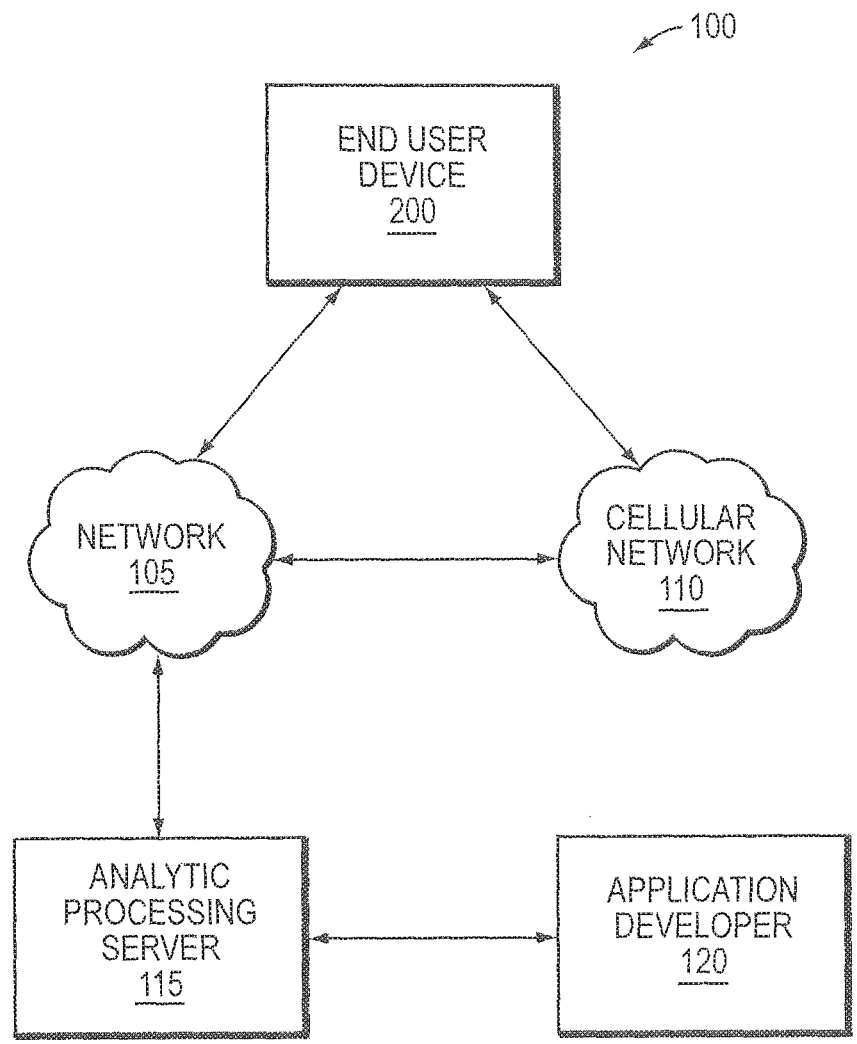
FIG. 1 is a schematic block diagram of an exemplary computing environment in accordance with an illustrative embodiment of the present invention.

FIG. 1 is a schematic block diagram of an exemplary computing environment 100 in accordance with an illustrative embodiment of the present invention. Computing environment 100 is centered around a network 105 that is illustratively operatively interconnected with a cellular network 110. An end-user device 200, described further below in reference to FIG. 2, may comprise a cellular telephone, a tablet or other mobile device. More generally, the end-user device 200 may comprise any computing platform in which the principles of the present invention may be implemented. As such, the description of end-user device 200 being a mobile device should be taken as exemplary only. Also operatively interconnected with the network 105 is an analytic processing server 115. The analytic processing server may be further operatively interconnected with an application developer 120. The analytic processing server 115 may comprise the functionality to examine collected crash or state information from applications for the purpose of debugging. The analytic processing server 115 may be configured to receive such information by incorporating analytic code into an application developed by an application developer 120. One example of an analytic processing server 115 is described in U.S. Pat. No. 9,262,250, entitled SYSTEM AND METHOD FOR DATA COLLECTION AND ANALYSIS OF INFORMATION RELATING TO MOBILE APPLICATIONS, the contents of which are hereby incorporated by reference.

Figure 2:
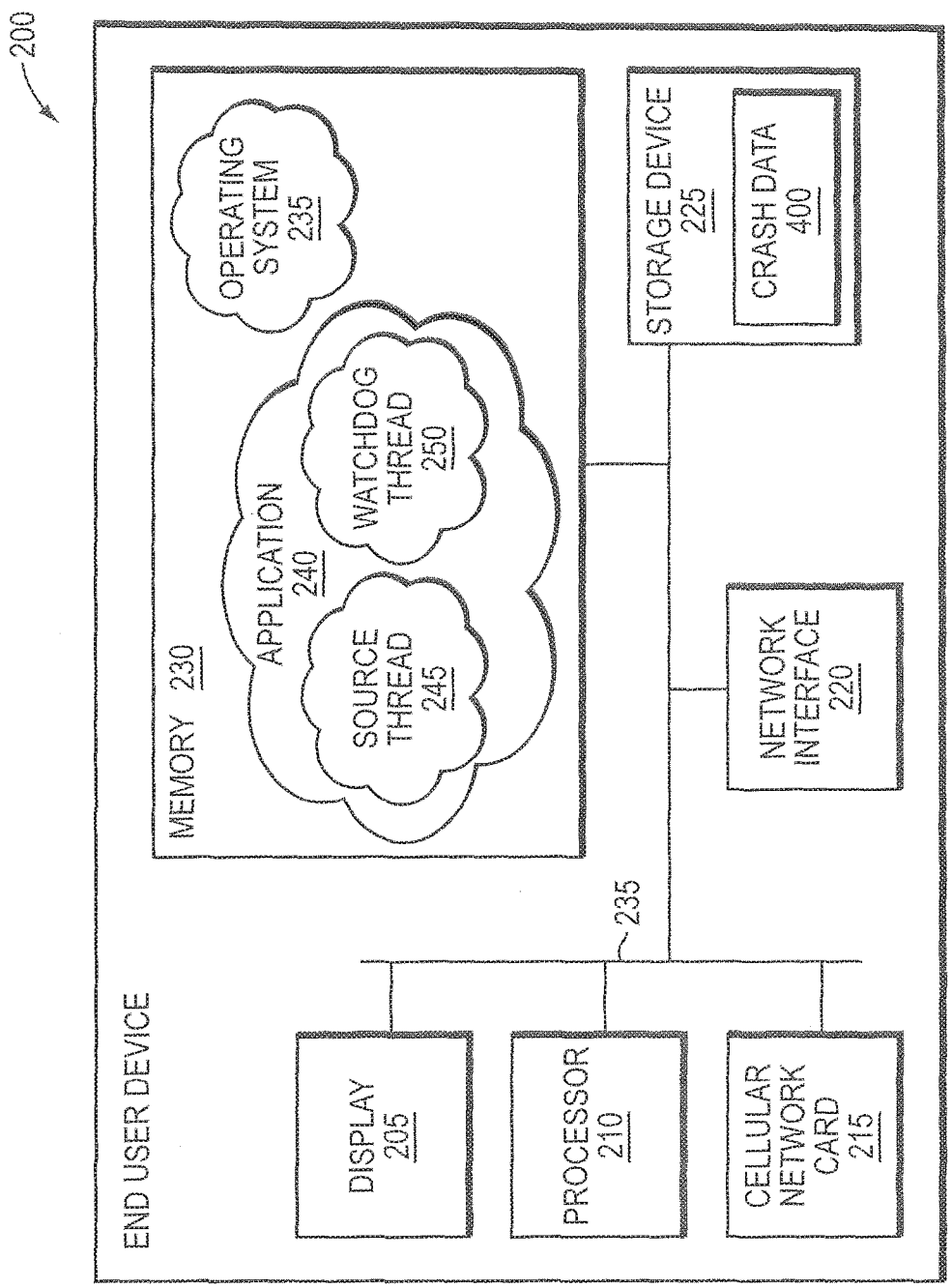
FIG. 2 is a schematic block diagram of an exemplary end user device in accordance with an illustrative embodiment of the present invention.

FIG. 2 is a schematic block diagram of an exemplary end the user device 200 in which the principles of the present invention may be implemented in accordance with an illustrative embodiment of the present invention. The end user device 200 illustratively comprises a mobile device such as, e.g., a cellular telephone, tablet computer, etc. However, it should be noted that in alternative embodiments of the present invention, the end-user device may comprise a non-mobile computing device such as a desktop computer, etc. As such, while this description is written in terms of the end-user device 200 comprising a mobile device, it should be noted that such description is exemplary only.

The end-user device 200 illustratively comprises a display 205, a processor 210, a cellular network card 215, a network interface 220, a storage device 225 and a memory 230 interconnected by a network bus 235. Display 205 illustratively comprises a touchscreen that enables a user to view applications as well as provide input for applications executing on the end-user device 200. The processor 210 may comprise the necessary elements and/or logic adapted to execute software programs and manipulate data structures. In alternative embodiments, processor 210 may comprise of a plurality of separate processors dedicated to particular functions. As such, the description of a single processor 210 should be taken as exemplary only.

The cellular network card 215 and the network interface 220 illustratively contain the mechanical, electrical and signaling circuitry for transmitting/receiving data over a cellular network and/or Wi-Fi network. The cellular network interface 215 and network interface 220 configured to transmit and/or receive data using a variety of different communication protocols, including, inter alfa, TCP/IP, UDP, ATM, SONET, HTTP, wireless protocols such as 802.11, frame relay, Ethernet Fiber Distributed Data Interface(FDDI), etc. Notably, the network interface 140 may also be used to implement one or more virtual network interfaces, such as for virtual private network (VPN) access, as is known to those skilled in the art.

The storage device 225 may comprise any form of storage adaptable for use in an end-user device. Examples of storage devices may comprise, micro hard disks, removable media, such as memory stick, Flash RAM, etc. Illustratively, the watchdog thread 250 may be configured to store crash data 400, described further below in reference to FIG. 4, in the storage device 225. In one embodiment of the invention, the watchdog thread may collect periodic state information relating to the executing application 240 and store at least a portion of that state information in crash data 400. Similarly in another embodiment, should the watchdog thread invoke a crash function due to the watchdog timer being exceeded, the crash function may store related state information in the crash data structure 400. The application 240 may be configured to, upon initialization, detect whether crash data 400 exists for the application. In response to determining that crash data 400 exists that is associated with the application, the application may be configured to forward the crash data 400 to analytic processing server 115. Such forwarding of crash data enables the analytic processing server 115 to receive state information relating to the application to be used for debugging purposes. Exemplary, the forwarding of the crash data may be performed on a background processed by the application depending upon network connectivity.

The operating system 235 may comprise a mobile operating system such as the Android operating system available from Google, Inc., the iOS operating system available from Apple, Inc., etc. Exemplary application 240 is stored within memory 230 of the end-user device 100 and is executed by processor 210. Illustratively, the application 240 may have a plurality of threads including, for example, a source thread 245 and a watchdog thread 250. The source thread 245 may illustratively comprise the main thread of the application 240 that contains the primary program control for the application. The watchdog thread 250 is illustratively utilized to implement the principles of the present invention in accordance with an illustrative embodiment thereof.

Figure 3:
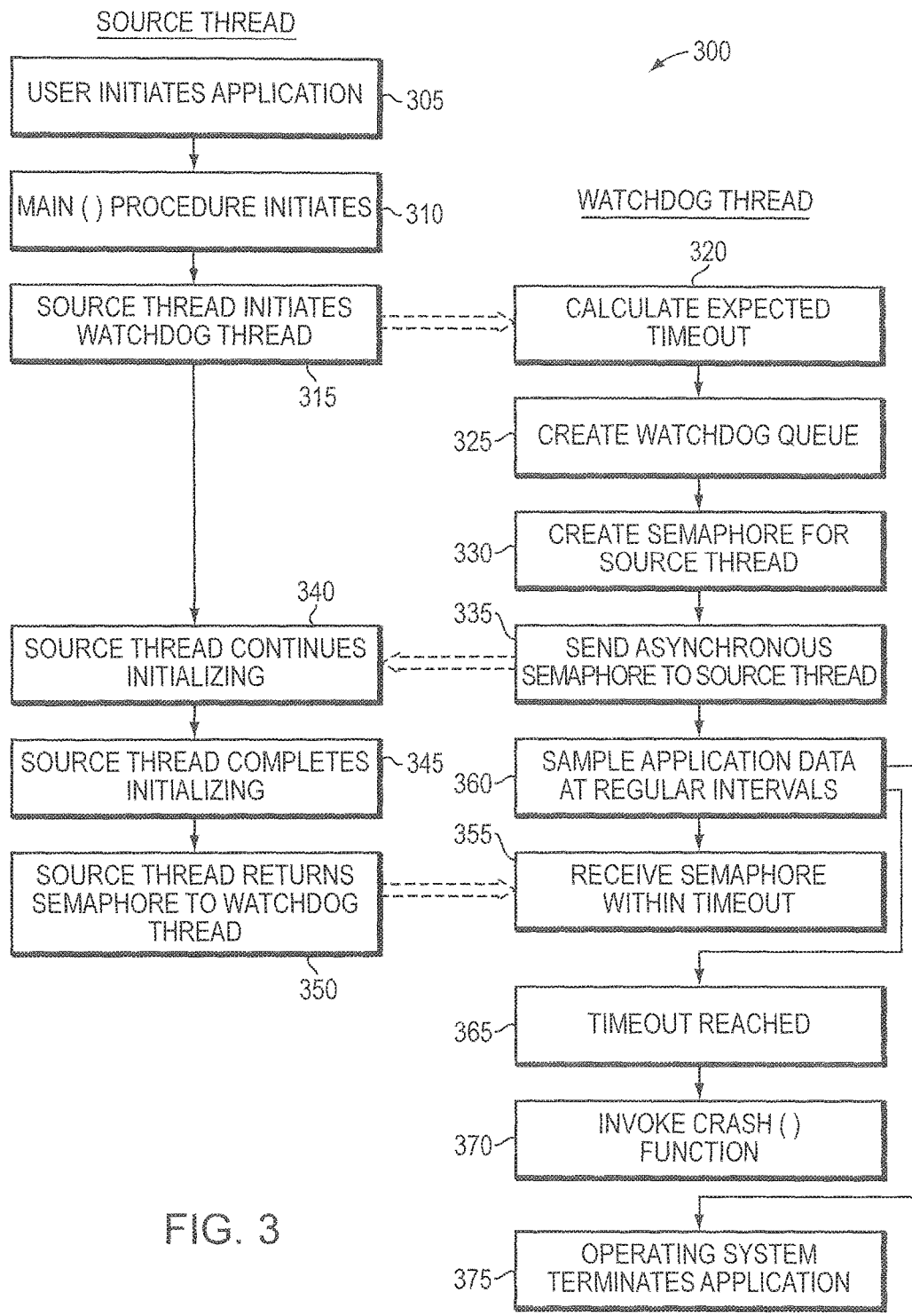
FIG. 3 is a flowchart detailing the steps of a procedure for utilizing a watch dog timer in accordance with an illustrative embodiment of the present invention.

FIG. 3 is a flowchart detailing the steps of a procedure 300 for utilizing a watchdog timer in accordance with an illustrative embodiment of the present invention. The procedure 300 begins in step 305 where the user initiates the application 240. A user may initiate an application by, for example, clicking on an icon associated with the application displayed to the user on display 205. Alternatively, an application may be initiated by, e.g., selecting an option within another application that causes the initialization of the application. For example, a user may click on a video link in a first application (e.g., a web browser), which causes a second application (e.g., a video player) to be initialized to play the video. As will be appreciated by those skilled in the art, any technique for initializing application may be utilized in accordance with various alternative embodiments of the present invention.

In response to the initiation of the application, the main( ) procedure begins to initiate in step 310. It should be noted that procedure 300 is written in terms of an initial launching of an application; however, in alternative embodiments, the principles of the present invention may be utilized for operations other than initialization. Examples of other operations that may be associated with mobile operating system timeout periods include, inter alia, moving an application to the background, moving an application to the foreground, etc. As such, while procedure 300 is written in terms of initializing an application, the principles of the present invention may be applied to the execution of other operations.

The source thread 245 then, in step 315, initiates a watchdog thread 250 associated with the application 240. The source thread may initiate the watchdog thread using conventional thread creation techniques. The watchdog thread 250 calculates an expected timeout value in step 320. Illustratively, this expected timeout value is the mobile operating system's timeout value associated with the operation to be performed. This may vary by type of operation, e.g., a 20 second timeout period for application initialization, 10 second timeout period for moving to background, etc.

The watchdog thread then creates a watchdog queue step 325 and a semaphore for the source thread in step 330. The asynchronous semaphore is sent to the source thread in step 335. More generally, the watchdog thread sends a message to the source thread requesting that the source thread respond upon completion of the operation. As such, the description of utilizing a semaphore should be taken as exemplary only.

The source thread continues initializing in step 340. Ideally, the source thread completes initialization in step 345 before the termination of the application by the operating system. In the event that the source thread completes the initialization in step 345, the source thread then returns the semaphore to the watchdog thread in step 350. More generally, the source thread responds to the initial message from the watchdog thread indicating that the operation has completed.

In one embodiment of the invention, the watchdog thread is configured to sample application state data at regular intervals while the source thread is executing the operation in step 360. This collected state data may then be saved as crash data 400. The crash data 400, described further below in reference to FIG. 4, may be later transferred to an analytic processing server 115 for analysis to aid in debugging the application 240.

In an other embodiment of the invention, the watchdog thread may not sample application data while the operation is being executed. Instead, the watchdog thread may sleep until either it receives the semaphore back from the source thread in step 355 or the watchdog timeout expires in step 365. In the event of the watchdog timeout being reached, the watchdog thread then invokes a crash( ) function in step 370. Illustratively, the crash( ) function is incorporated into the debugging modules of the application and is configured to collect state data and store at least a portion of the collected state data in a crash data structure 400. The crash( ) function then causes the termination of the application.

In another embodiment of the invention, the watchdog thread may collect application data at regular intervals in step 360 but may take no action in the event of the watchdog timeout period being exceeded. In such a case, the operating system will terminate the application in step 375 when the operating system's timeout period is exceeded. However, even though the operating system has abruptly terminated the application, the watchdog thread had collected and saved state information in a crash data structure 400 that may be used for debugging purposes.

In accordance with an alternative embodiment of the invention, the collected state data may be transferred to the analytic processing server for use in computing watchdog timeout periods. That is, the collected state data may provide empirical data used in determining the watchdog timeout periods to be utilized. This may be advantageous in determining the timeout period, especially in the event that the developer of the mobile operating system does not publically disclose the operating system's timeout period.

As will be appreciated by those skilled in the art, various combinations and permutations of actions may be taken by the watchdog thread. Several specific examples have been described herein; however, it should be noted that these examples are not to be viewed as limiting. In one alternative embodiment, the watchdog thread, in response to the elapsed time of the source thread performing the predefined operation approaching a threshold that is less than the watchdog timeout period, may transmit a message to the source thread indicating that the watchdog timeout period is about to expire. In response, the source thread may skip certain steps in performing the operation. For example, if the operation is initializing the application, the source thread may not perform optional activities. This increases the chance that the source thread may complete the operation prior to either the watchdog timeout period or the operating system timeout period being exceeded. This alternative embodiment provides for an increased chance that the source thread may complete the operation and reduces the chance of the application being terminated early by either the mobile operating system of by invocation of a crash function by the watchdog thread.

Figure 4:
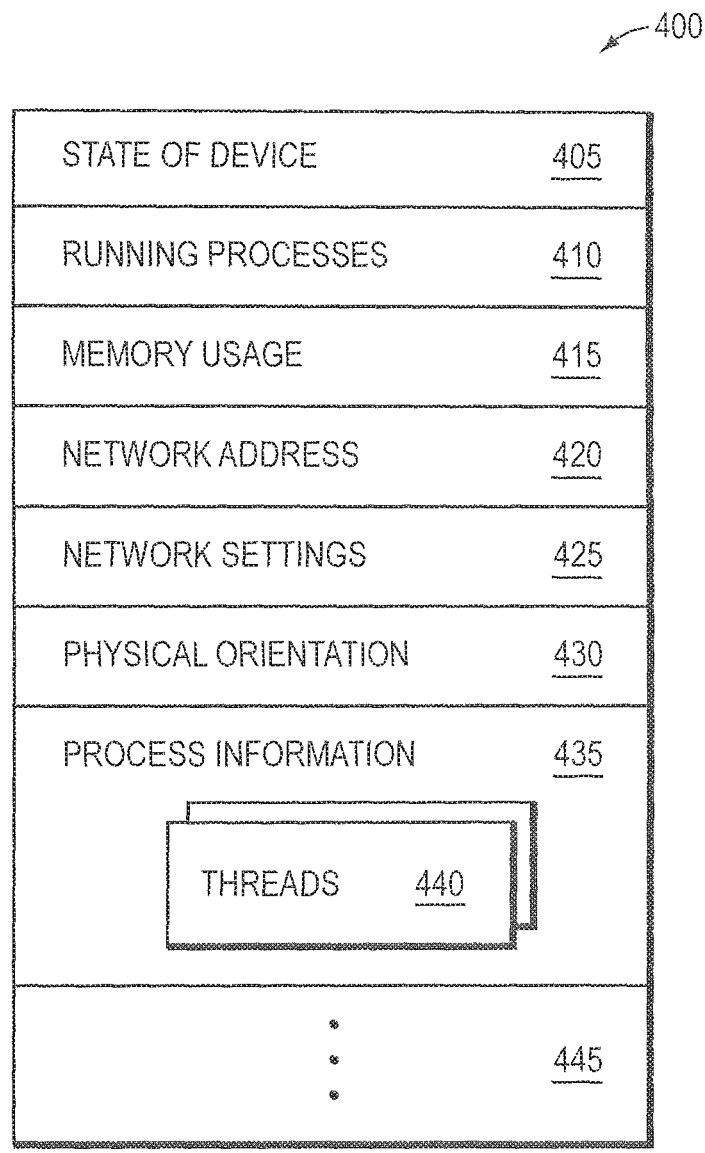
FIG. 4 is a schematic block diagram of an exemplary crash (state) data structure in accordance with an illustrative embodiment of the present invention.

FIG. 4 is an exemplary schematic diagram of an exemplary crash data structure 400 that may be utilized with an illustrative embodiment of the present invention. The crash data structure 400 may be utilized by the application 240, or any of its threads, including, e.g., the source thread 245 and/or watchdog thread 250, to store various state information that is collected. Illustratively, the crash data structure 400 comprises a plurality of fields including, for example, a state field 405, a list of running processes field 410, memory usage field 415, network address field 420, network settings field 425, physical orientation information 430, a field for each process 435 which may include separate sub fields 440 for each thread and, in alternative embodiments, additional fields 445.

It should be noted that the various descriptions and embodiments described herein are exemplary only. The aspects of the invention may be implemented in software, such as a non-transitory computer readable medium, hardware, firmware or any combination thereof. For example, a non-transitory computer readable medium can be configured with instructions to perform one or more of the steps as described in relation to procedure hundred. Further, while this description is written in references to particular operating systems and/or end-user devices, one skilled in the art will appreciate that the functionality may be implemented and differing environments. As such description of iOS environment operating on a mobile device should be taken as exemplary only.

What is claimed is:

1. A computer-implemented method comprising:
   after a native application begins a particular operation, initiating a request to receive an indication in response to the particular operation being completed;
   periodically sampling application state data unless or until the indication is received;
   determining an amount of time that the operation system is to allow for the particular operation to be performed by the native application before the operating system designates the native application has having crashed based on stored sampled application state data in crash data; and after the determined amount of time that an operating system is to allow for the particular operation to be performed by the native application before the operating system designates the native application as having crashed has elapsed, storing at least a portion of the sampled application state data as the crash data, then terminating the native application.

2. The computer-implemented method of claim 1, further comprising:
generating a first thread in response to the native application beginning the particular operation.

3. The computer-implemented method of claim 2, further comprising:
determining a timeout period less than the amount of time that the operating system allows for the particular operation to be performed; and
in response to the timeout period elapsing, monitoring, by the first thread, the timeout period before indicating a crash of the particular operation.

4. The computer-implemented method of claim 3, further comprising:
transmitting a message to a second thread to indicate that the timeout period is about to expire in response to the amount of time having elapsed to a predefined threshold that is less than the timeout period.

5. The computer-implemented method of claim 2, further comprising:
transmitting a locking request with the request to receive the indication to guarantee the indication will be received regardless of the native application having crashed.

6. The computer-implemented method of claim 1, further comprising:
determining an existence of the crash data in response to determining the amount of time that the operation system allows for the particular operation to be performed by the native application before the operating system designates the native application as having crashed has elapsed.

7. A system comprising:
one or more computers and one or more storage devices storing instructions that are operable, when executed by the one or more computers, to cause the one or more computers to perform operations comprising:
after a native application begins a particular operation, initiating a request to receive an indication in response to the particular operation being completed;
periodically sampling application state data unless or until the indication is received;
determining an amount of time that the operation system is to allow for the particular operation to be performed by the native application before the operating system designates the native application has having crashed based on stored sampled application state data in crash data; and
after the determined amount of time that an operating system is to allow for the particular operation to be performed by the native application before the operating system designates the native application as having crashed has elapsed, storing at least a portion of the sampled application state data as the crash data, then terminating the native application.

8. The system of claim 7, wherein the operations further comprise:
generating a first thread in response to the native application beginning the particular operation.

9. The system of claim 8, wherein the operations further comprise:
determining a timeout period less than the amount of time that the operating system allows for the particular operation to be performed; and
in response to the timeout period elapsing, monitoring, by the first thread, the timeout period before indicating a crash of the particular operation.

10. The system of claim 9, wherein the operations further comprise:
transmitting a message to a second thread to indicate that the timeout period is about to expire in response to the amount of time having elapsed to a predefined threshold that is less than the timeout period.

11. The system of claim 8, wherein the operations further comprise:
transmitting a locking request with the request to receive the indication to guarantee the indication will be received regardless of the native application having crashed.

12. The system of claim 7, wherein the operations further comprise:
determining an existence of the crash data in response to determining the amount of time that the operation system allows for the particular operation to be performed by the native application before the operating system designates the native application as having crashed has elapsed.

13. A non-transitory computer-readable medium storing software comprising instructions executable by one or more computers which, upon such execution, cause the one or more computers to perform operations comprising:
after a native application begins a particular operation, initiating a request to receive an indication in response to the particular operation being completed;
periodically sampling application state data unless or until the indication is received;
determining an amount of time that the operation system is to allow for the particular operation to be performed by the native application before the operating system designates the native application has having crashed based on stored sampled application state data in crash data; and
after the determined amount of time that an operating system is to allow for the particular operation to be performed by the native application before the operating system designates the native application as having crashed has elapsed, storing at least a portion of the sampled application state data as the crash data, then terminating the native application.

14. The computer-readable medium of claim 13, wherein the operations further comprise:
generating a first thread in response to the native application beginning the particular operation.

15. The computer-readable medium of claim 14, wherein the operations further comprise:
determining a timeout period less than the amount of time that the operating system allows for the particular operation to be performed; and
in response to the timeout period elapsing, monitoring, by the first thread, the timeout period before indicating a crash of the particular operation.

16. The computer-readable medium of claim 14, wherein the operations further comprise:

transmitting a locking request with the request to receive the indication to guarantee the indication will be received regardless of the native application having crashed.

17. The computer-readable medium of claim 13, wherein the operations further comprise:

determining an existence of the crash data in response to determining the amount of time that the operation system allows for the particular operation to be performed by the native application before the operating system designates the native application as having crashed has elapsed.

\* \* \* \* \*

UNITED STATES PATENT AND TRADEMARK OFFICE
CERTIFICATE OF CORRECTION

| | | |
|---|---|---|
| PATENT NO. | : 10,365,960 B2 | Page 1 of 1 |
| APPLICATION NO. | : 15/617169 | |
| DATED | : July 30, 2019 | |
| INVENTOR(S) | : Perry et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this
Tenth Day of January, 2023

Katherine Kelly Vidal
*Director of the United States Patent and Trademark Office*